(12) United States Patent
Ardeli et al.

(10) Patent No.: US 10,992,702 B2
(45) Date of Patent: Apr. 27, 2021

(54) DETECTING MALWARE ON SPDY CONNECTIONS

(71) Applicant: Hewlett Packard Enterprise Development LP, Houston, TX (US)

(72) Inventors: Ramesh Ardeli, Sunnyvale, CA (US); Hari Krishna Kurmala, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 236 days.

(21) Appl. No.: 16/072,978

(22) PCT Filed: Jan. 27, 2016

(86) PCT No.: PCT/US2016/015012
§ 371 (c)(1),
(2) Date: Jul. 26, 2018

(87) PCT Pub. No.: WO2017/131645
PCT Pub. Date: Aug. 3, 2017

(65) Prior Publication Data
US 2019/0052649 A1 Feb. 14, 2019

(51) Int. Cl.
*H04L 29/06* (2006.01)
*H04L 29/08* (2006.01)
(Continued)

(52) U.S. Cl.
CPC .......... *H04L 63/145* (2013.01); *G06F 21/564* (2013.01); *H04L 9/0643* (2013.01);
(Continued)

(58) Field of Classification Search
CPC ............................ H04L 63/145; G06F 21/594
See application file for complete search history.

(56) References Cited

U.S. PATENT DOCUMENTS 8,644,339 B1  2/2014 Krishna et al.
8,949,464 B2  2/2015 L'Heureux et al.
(Continued)

FOREIGN PATENT DOCUMENTS

CN        1819547 A    8/2006
CN      101682558 A    3/2010
(Continued)

OTHER PUBLICATIONS

Frank Paolino, "Cloud Based Media Workflows: an Akamai Approach," Jul. 2, 2014, pp. 1-3, The Akamai Blog.
(Continued)

*Primary Examiner* — William S Powers
(74) *Attorney, Agent, or Firm* — Tong, Rea, Bently & Kim, LLC

(57) ABSTRACT

In example implementations, a method is provided that is executed by a processor. A multiplexed data stream is received over a single transmission control protocol (TCP) connection that uses a SPDY protocol. The multiplexed data stream contains data packets associated with a plurality of different data streams. A plurality of sub-contexts are generated. Each one of the sub-contexts is associated with a different one of the plurality of different data streams. The data packets are demultiplexed from the multiplexed data stream into a respective one of the plurality of sub-contexts. The plurality of different data streams in the respective one of the plurality of sub-contexts are examined to detect a malware.

18 Claims, 5 Drawing Sheets

(51) Int. Cl.
*G06F 21/56* (2013.01)
*H04L 9/06* (2006.01)

(52) U.S. Cl.
CPC ...... *H04L 63/0245* (2013.01); *H04L 63/1416* (2013.01); *H04L 63/1425* (2013.01); *H04L 67/02* (2013.01); *H04L 69/08* (2013.01); *H04L 69/321* (2013.01)

(56) References Cited

U.S. PATENT DOCUMENTS

| | | | |
|---|---|---|---|
| 9,282,043 B1* | 3/2016 | Cao | H04L 47/12 |
| 2005/0060535 A1 | 3/2005 | Bartas | |
| 2007/0229521 A1 | 10/2007 | Li et al. | |
| 2007/0261112 A1* | 11/2007 | Todd | G06F 21/577 |
| | | | 726/11 |
| 2010/0138432 A1* | 6/2010 | Noyes | G06F 7/02 |
| | | | 707/758 |
| 2013/0227078 A1 | 8/2013 | Wei et al. | |
| 2013/0297814 A1* | 11/2013 | Annamalaisami | H04L 69/26 |
| | | | 709/230 |
| 2014/0337614 A1 | 11/2014 | Kelson et al. | |
| 2015/0082433 A1 | 3/2015 | Harlacher et al. | |
| 2016/0269422 A1* | 9/2016 | McDougal | G06F 21/568 |

FOREIGN PATENT DOCUMENTS

| | | |
|---|---|---|
| CN | 101965573 A | 2/2011 |
| CN | 102907071 A | 1/2013 |
| CN | 102985928 A | 3/2013 |
| CN | 103870206 A | 6/2014 |
| JP | 0528103 A | 2/1993 |
| WO | 97/31461 A1 | 8/1997 |
| WO | WO-2015147354 | 10/2015 |

OTHER PUBLICATIONS

International Searching Authority, The International Search Report and the Written Opinion, dated Oct. 17, 2016, PCT/US2016/015012, 11 Pgs.

Mike Belshe and Roberto Peon, "SPDY Protocol—Draft 3," 2015, pp. 1-29, Chromium.org.

Tonnes Ingebrigtsen, "Security Report 2015," 2015, pp. 1-64, Mnemonic.

* cited by examiner

DETECTING MALWARE ON SPDY CONNECTIONS

BACKGROUND

The growth of Internet traffic has led to development of a modified hypertext transfer protocol (HTTP) called SPDY. SPDY protocol provides an improvement to HTTP that allows multiple concurrent streams of data to be multiplexed into a single transmission control protocol (TCP) connection between an endpoint and a server. As a result, rather than using a sequential process used by previous HTTP where data streams are sent one after another, SPDY protocol allows multiple data streams to be multiplexed or interleaved with one another and sent asynchronously.

DETAILED DESCRIPTION

Certain implementations of the present disclosure are directed to systems and methods for detecting a malware on SPDY connections. As discussed above, SPDY protocol is an improvement to HTTP that allows multiple concurrent streams of data to be multiplexed into a single TCP connection. In a traditional HTTP protocol, data streams are sent in a sequential fashion. As a result, a unified threat management (UTM) device can analyze the data packets and the entire file one at a time.

However, with the SPDY protocol since data packets are multiplexed into a single data steam and with "prioritization" support, the server can interleave the data packets associated with different streams. As a result, the UTM device may not be able to analyze the data packets for malware by processing them in sequential order. As a result, conventional methods of checking for malware by processing the packets in order may not be able to detect the malware and subsequently malware content may be passed through to the client.

Certain examples of the present disclosure provide an improved UTM device that generates sub-contexts for each data stream that is multiplexed into a single data stream that uses the SPDY protocol. As a result, each data packet can be analyzed to detect malware and the entire file can be analyzed to detect malware after being assembled in a respective sub-context.

Figure 1:
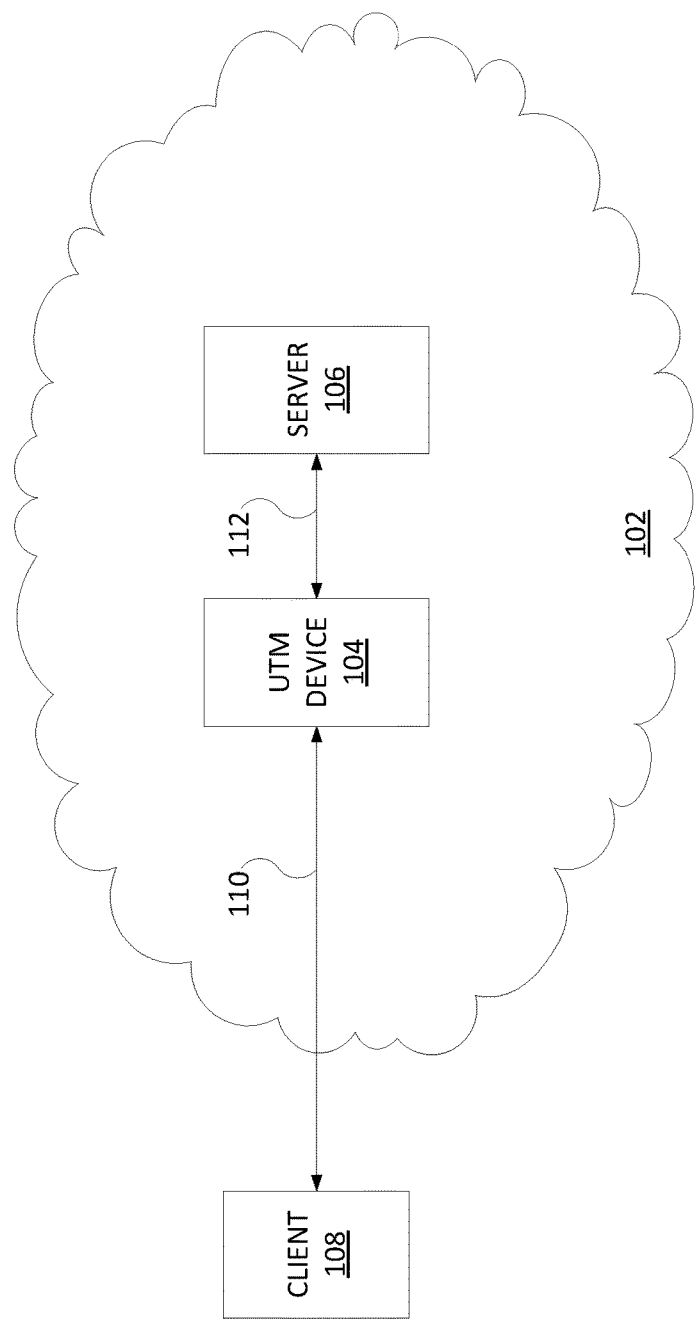
FIG. 1 is a block diagram of an example system of the present disclosure.

FIG. 1 illustrates an example system 100 of the present disclosure. The system 100 may include a UTM device 104, a server 106 and a client 108. Although a single UTM device 104, a single server 106 and a single client 108 are illustrated in FIG. 1, it should be noted that any number of UTM devices 104, servers 106 and clients 108 may be deployed.

In one example, the UTM device 104 and the server 106 may be located within an Internet Protocol (IP) network 102. The IP network 102 may be any type of packet network (e.g., the Internet). It should be noted that the IP network 102 has been simplified for ease of explanation and may include other network elements that are not shown, such as gateways, routers, switches, access networks, and the like.

In one example, the client 108 may be any type of endpoint device (e.g., a smart phone, a lap top computer, a desktop computer, a tablet computer, and the like). The client 108 may establish a TCP connection with the server 106 over a wired or wireless connection to request data. The TCP connection may be a stateful IP connection that uses an orderly SYN-ACK-data-FIN sequence.

In one example, the server 106 may be a server that hosts a website, database or any other source of data that is accessible over the wired or wireless connection with the client 108. For example, the server 106 may host a website and the client 108 may establish a communication session or TCP connection with the server 106 to request and receive data from the server 106.

In one example, client 108 may establish the TCP connection to the server 106 via the UTM device 104 using the connections 110 and 112. In one example, the connections 110 and 112 may be a TCP connection that uses the SPDY protocol. As described above, SPDY protocol is an improvement to existing HTTP protocol that allows multiple data streams to be multiplexed into a single data stream and sent asynchronously over the single TCP connection. For example, multiple data stream requests may be sent by the client 108. Using the traditional HTTP protocol, each data stream request would use a separate TCP connection. However, using the SPDY protocol, each data stream may be sent from the server 106 to the client 108 in a multiplexed data stream over the single TCP connection resulting in faster downloads of data.

However, as noted above, the SPDY protocol may result in new security risks. The UTM device 104 may be located between the server 106 and the client 108 to examine the data packets within the multiplexed data stream to detect a malware, as described below.

In one implementation, the UTM device 104, the server 106 and the client 108 may be deployed as computers using a processor and non-transitory computer readable storage mediums. The non-transitory computer readable storage mediums may store instructions that are executed by the processor to perform the functions described herein.

Figure 2:
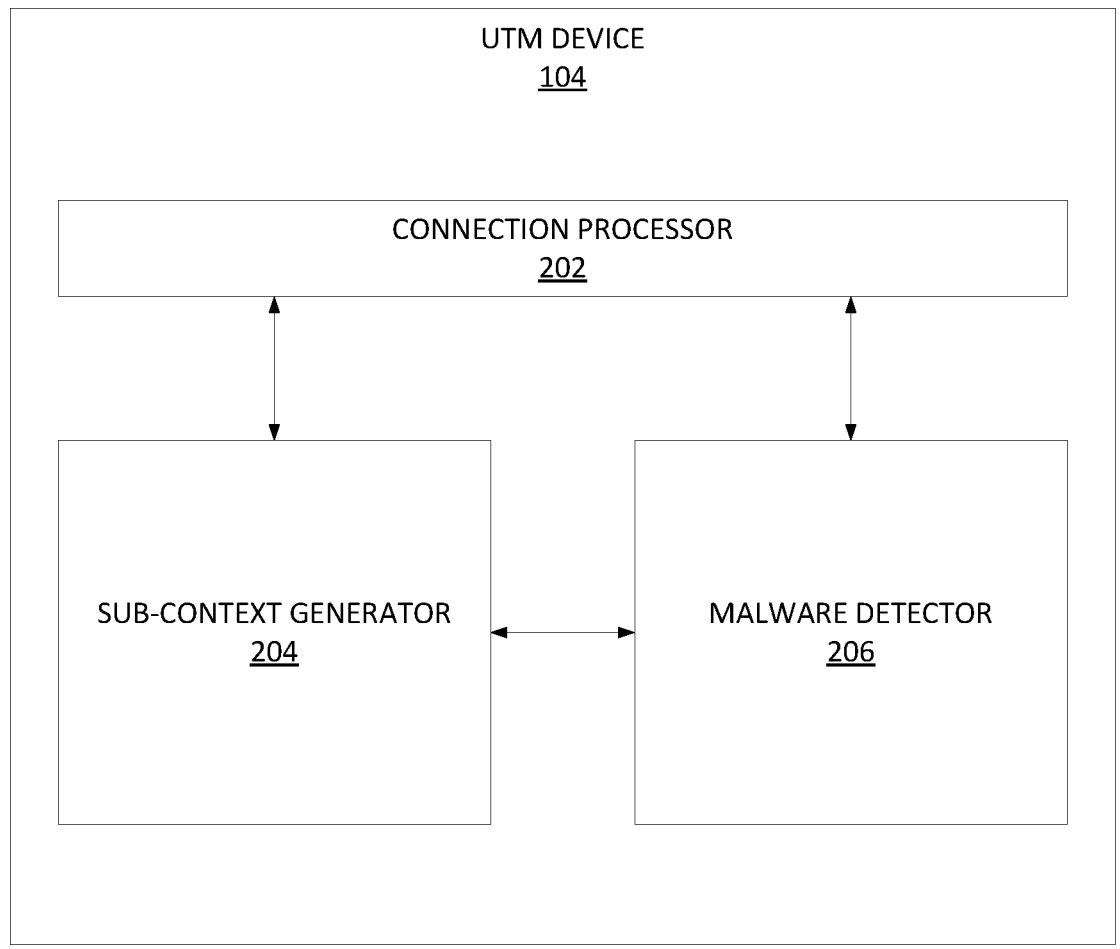
FIG. 2 is an example of an apparatus of the present disclosure.

FIG. 2 illustrates a block diagram of an example of the UTM device 104. In one example, the UTM device 104 may include a connection processor 202, a sub-context generator 204 and a malware detector 206. In one example, the connection processor 202 may pass TCP messages between the client 108 and the server 106 to establish a TCP connection that uses the SPDY protocol. In one example, the connection processor 202 may also be in communication with the sub-context generator 204 to provide data packets transmitted over the TCP connection to the sub-context generator 204 for analysis.

In one example, the sub-context generator 204 may include a memory that stores each sub context generated for each different data stream. In one example, each data stream request is associated with a stream identification (ID). A sub-context may be defined as a temporary buffer in the memory of the sub-context generator 204 that is used to re-assemble data packets into a respective data stream. For example, a first sub-context may be generated to reassemble a first file using data packets associated with a stream ID 1, a second sub-context may be generated to reassemble a second file using data packets associated with a stream ID 2, and so forth.

After a file is completely reassembled and analyzed for malware, the sub-context may be deleted and memory space may be freed to generate a new sub-context for a different data stream or stream ID number. In one implementation, the sub-context generator 204 may know when a file is completed based on a size of the file that is provided in an initial data stream request message sent from the client 108 to the server 106. Thus, when the size of the file within a particular sub-context is the same as the size of the file indicated in the initial data stream request, the sub-context generator 204 may know that a file is completed.

In one example, the sub-context generator 204 may also perform a hash computation on each data packet and a completed file of data packets within a respective sub-context. In one example, the hash computation may be an incremental hash computation on each data packet until the hash computation is performed on the entire file. A hash value that is computed may be provided to the malware detector 206 to determine if a malware is present in a data packet or the completed file. In one example, the hash computation may be a message digest 5 (MD5) hash computation and value.

In one example, the malware detector 206 may include a cache lookup and a signature database. The cache lookup may temporarily store the hash values that are provided by the sub-context generator 204. The cache lookup may send a query to the signature database that stores a plurality of signatures (e.g., previously computed hash values associated with different types of malware). The signature database may perform the comparison and provide a response to the cache lookup indicating whether or not a match was found.

In one example, if a match was found in a data packet or the completed file, the malware detector 206 may send a notification to the connection processor 202 and the connection processor 202 may drop the TCP connection. As a result, the entire file, as well as the other data packets associated with other data streams, are not sent to the client 108.

Figure 3:
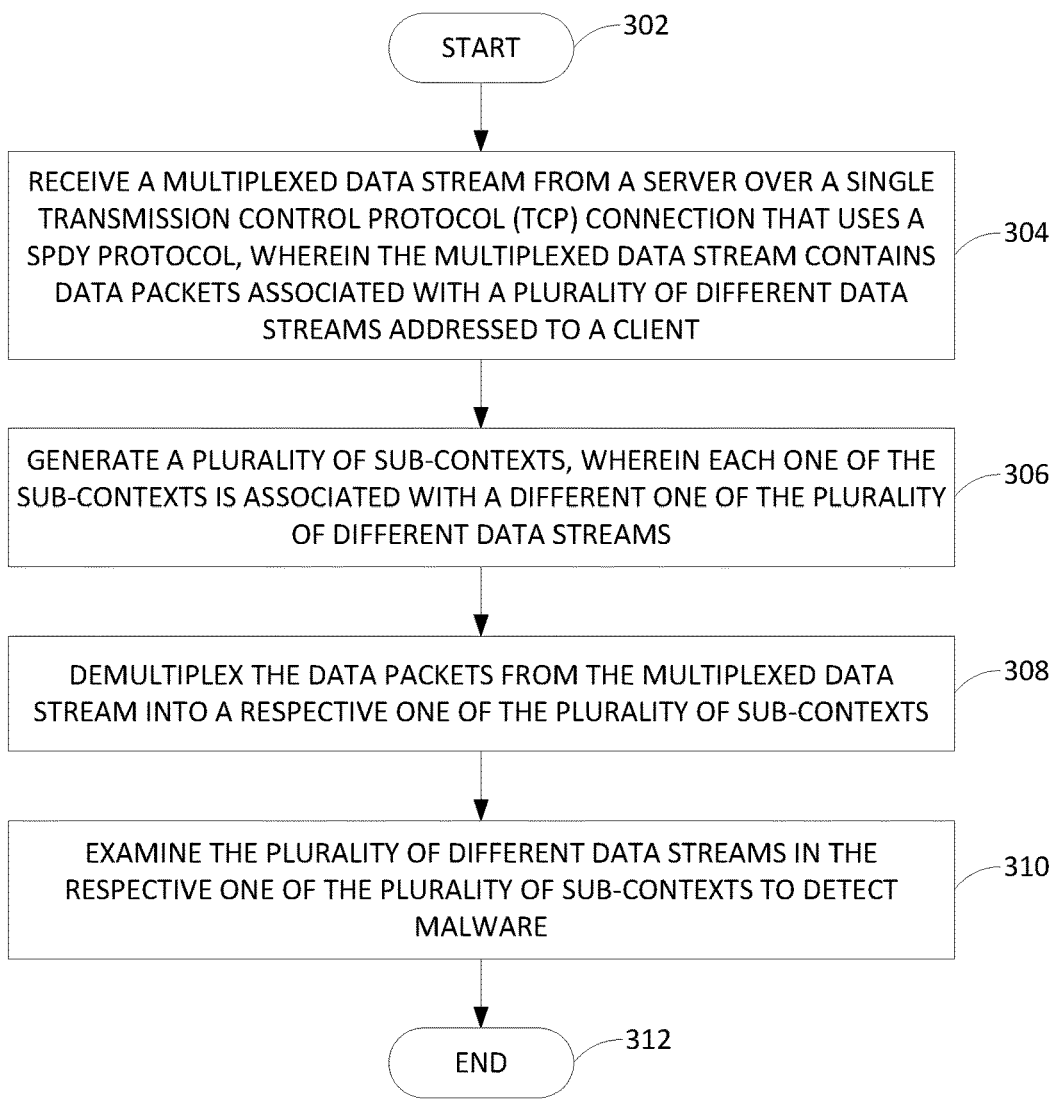
FIG. 3 is a flow diagram of an example method for detecting a malware on a SPDY connection.

FIG. 3 illustrates a flow diagram of an example method 300 for detecting a malware on a SPDY connection. In one example, the blocks of the method 300 may be performed by the UTM device 104 or the apparatus 500.

At block 302, the method 300 begins. At block 304, the method 300 receives a multiplexed data stream from a server over a single transmission control protocol (TCP) connection that uses a SPDY protocol, wherein the multiplexed data stream contains data packets associated with a plurality of different data streams addressed to a client. For example, a client may try to connect to a website hosted by a server and request a plurality of different data streams for different portions of the webpage. Each data stream may be associated with a different file for the webpage. The request may include a stream ID for a particular file, a priority level, and a size of the file.

In one implementation, the requests for the plurality of different data streams may be acknowledged by the server and a TCP connection may be established. The server may use the SPDY protocol to multiplex the data packets associated with each stream ID into a single data stream that is transmitted over the TCP connection. The data packets may be sent in an asynchronous manner. In other words, the data packets are not sent in a sequential order that sends all of the data packets of a first stream ID, then all of the data packets of a second stream ID, and so forth.

At block 306, the method 300 generates a plurality of sub-contexts, wherein each one of the plurality of sub-contexts is associated with a different one of the plurality of different data streams. For example, if there are three data streams, then three sub-contexts may be generated. In other words, a sub context may be generated for each data stream.

At block 308, the method 300 demultiplexes the data packets from the multiplexed data stream into a respective one of the plurality of sub-contexts. For example, the UTM device may intercept the data packets from the server that are addressed to the client and attempt to reassemble the data packets for a particular stream ID via a respective sub-context. For example, if there are three different stream IDs, the UTM device may generate three different sub-contexts. In other words, each stream ID would be associated with a respective one of the three different sub-contexts.

In one example, the sub-contexts provide a way for the UTM device to reorganize the data packets to examine the data packets for malware and to ensure un-examined data packets are not forwarded to the client. In one implementation, the sub-contexts may act as a proxy. In other words, the sub-context may hold the data packets associated with a stream ID or file until all of the data packets and the file are examined for malware. The file may then be forwarded to the client if no malware is detected.

In another implementation, the sub-context may be operated in an inline-mode. For example, each data packet may be placed in a respective sub-context, examined and forwarded as the data packets arrive. For example, an incremental hash computation may be performed on each data packet. After the last data packet for a particular stream ID is examined and found to be free of malware, the client may receive the entire file. However, if any data packet contains malware, the TCP connection can be reset or dropped. In one example, a data stream associated with the data packet containing the malware may be reset rather than resetting the entire TCP connection.

As noted above, the sub-context can be generated in memory within the UTM device. However, there may be a limited amount of memory available. If there are a large amount of data streams being requested in parallel, the UTM device may run out of memory to create a new sub-context. If the priority level associated with the request for the new data stream is equal to or lower than the priority levels of the previously requested data streams, the UTM device may simply process the data packets associated with the new data stream after a previously requested data stream is finished being examined and the associated sub-context is removed.

However, if the priority level associated with the request for the new data stream is greater than the priority levels of the previously requested data streams, the UTM device may change the priority level to be equal to the priority level of the previously requested data streams before forwarding the request to the server. As a result, the request for the new data stream may not interrupt the existing sub-contexts generated in memory that are processing and examining the data packets that are associated with the previously requested data streams.

At block 310, the method 300 examines the plurality of different data streams in the respective one of the plurality of sub-contexts to detect malware. In one example, the UTM device may calculate a hash value for each data packet and the entire file after the data packets are reassembled in a respective sub-context. The hash value may be compared to hash values stored in a database that are associated with known malware. If a match is found between the hash value of a data packet or a file and a hash value of a known malware, then the UTM device has detected a malware and the TCP connection may be reset or disconnected. In one example, a data stream associated with the data packet containing the malware may be reset rather than resetting the entire TCP connection. At block 312, the method 300 ends.

Figure 4:
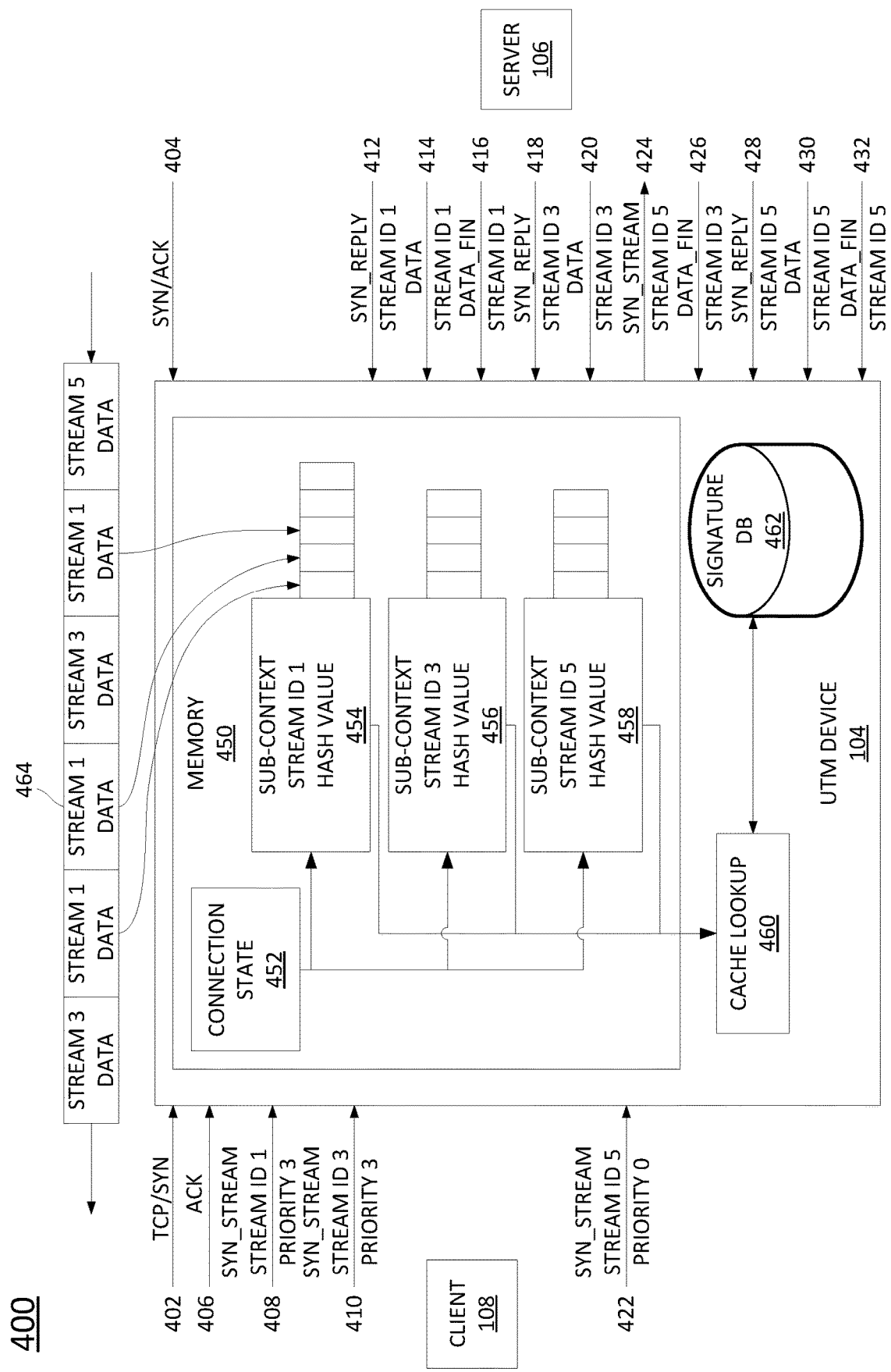
FIG. 4 is another flow diagram of an example method for detecting a malware on a SPDY connection.

FIG. 4 illustrates a more detailed diagram of an example method 400 for detecting a malware on a SPDY connection. The method 400 may be performed by the system 100 including the client 108, the UTM device 104 and the server 106. It should be noted that the messages that are transmitted in FIG. 4 each pass through the UTM device 104.

At block 402, the client 108 may send a TCP/SYN message to the server 106. At block 404, the server 106 may send a SYN/ACK message back to the client 108 acknowledging the TCP/SYN message. At block 406, the client 108 may send an ACK message to the server 106 and a TCP connection may be established between the client 108 and the server 106. A connection state 452 in the UTM device 104 may maintain the TCP connection.

At block 408, the client 108 may send a SYN_STREAM message. The SYN_STREAM message may be a type of message associated with the SPDY protocol. The UTM device 104 may examine the SYN_STREAM message and identify the stream ID 1 and the priority level 3. If there is enough space in a memory 450 of the UTM device 104, the UTM device 104 may generate a sub-context 454 associated with the stream ID 1.

At block 410, the client 108 may also send a second SYN_STREAM message in parallel with the SYN_STREAM message sent in block 408. The UTM device 104 may examine the second SYN_STREAM message and identify the stream ID 3 and the priority level 3. If there is enough space in the memory 450 of the UTM device 104, the UTM device 104 may generate a sub-context 456 associated with the stream ID 3.

At block 412, the server 106 may send a SYN_REPLY message for stream ID 1. The SYN_REPLY message may also be a type of message that is associated with the SPDY protocol. At block 414, the server 106 may send data packets associated with the stream ID 1. At block 416, the server 106 may send a DATA FIN message for stream ID 1 indicating that all of the data packets associated with the stream ID 1 have been sent.

At block 418, the server 106 may send a SYN_REPLY message for stream ID 3. The SYN_REPLY message may also be a type of message that is associated with the SPDY protocol. At block 420, the server 106 may send data packets associated with the stream ID 3.

It should be noted that the blocks 414 and 420 may be repeated for each data packet for stream ID 1 and stream ID 3, respectively. In addition, it should be noted that blocks 414 and 420 may not occur in the order that is illustrated in FIG. 4. As noted above, the SPDY protocol allows data packets for data streams to be sent asynchronously. In other words, the data packets for different data streams may be multiplexed together and sent via a single data stream over a single TCP connection. Thus, periodically the block 420 may occur before the block 414. For example, the server 106 may send a data packet for stream ID 3 before a data packet for stream ID 1.

FIG. 4 illustrates an example multiplexed data stream 464. The data stream may include a first data packet for stream ID 3, a second data packet for stream ID 1, a third data packet for stream ID 1, a fourth data packet for stream ID 3, and so forth. The UTM device 104 may place each data packet into a respective sub-context. For example, the first data packet for stream ID 3 may be placed into the sub-context 456, the second data packet for stream ID 1 may be placed into the sub-context 454, and so forth.

In one example, the UTM device 104 may operate in a proxy mode that temporarily stores the data packets in the respective sub-context until all of the data packets and the entire file for a particular stream ID have been examined or analyzed for malware. After the data packets and the entire file have been examined and are free of malware, the data packets of the entire file may be forwarded to the client 108. In another example, the UTM device 104 may operate in an in-line mode that examines each data packet and then forwards the data packet to the client 108.

In one example, the UTM device 104 may perform a hash computation on each data packet to obtain a hash value. In one example, the hash computation may be an MD5 hash computation to obtain an MD5 hash value. The hash value may be sent to a cache lookup 460. In one example, the cache lookup 460 may queue the requested hash value look ups for each data packet as the data packets are processed by the UTM device 104. The cache lookup 460 may send a query to a signature database (DB) 462.

The signature DB 462 may be a MD5 hash database that stores MD5 hash values of known malware signatures. The signature DB 462 may be periodically updated with new MD5 hash values associated with signatures of new malware that are discovered. The signature DB 462 may send a reply to the cache lookup 460 indicating whether a match is found. If a match is found, the cache lookup may send a message to the connection state 452 indicating that a malware has been detected and the connection state 452 may reset or drop the TCP connection. In one example, a data stream associated with the data packet containing the malware may be reset using a RST_STREAM command message rather than resetting the entire TCP connection.

At block 422, the client 108 may send a new SYN_STREAM message. In one example, the new SYN_STREAM message may be sent before the data streams associated with stream ID 1 and stream ID 3 are completed. The UTM device 104 may examine the SYN_STREAM message to identify the stream ID 5 and a priority 0. If the UTM device 104 has space in the memory 450, a sub-context 458 may be generated for the stream ID 5. The UTM device 104 may pass the SYN_STREAM message unaltered and the SYN_STREAM message may be processed normally similar to the SYN_STREAM message associated with the stream ID 1, as described above.

In another example, the UTM device 104 may determine that no space is available in the memory 450. As a result, the UTM device 104 may modify the priority level of the stream ID 5 to a priority level that is equal to or lower than the priority level of the currently processing stream IDs (e.g., stream ID 1 and stream ID 3). For example, the UTM device 104 may change the priority level of stream ID 5 from 0 to 3.

At block 424, the UTM device 104 may forward the altered SYN_STREAM message to the server 106. Due to the changed priority level of the stream ID 5, the method 400 may complete processing of the stream ID 1 and stream ID 3 before processing stream ID 5. At block 426, the server 106 sends a DATA_FIN message for stream ID 3.

At block 428, the server 106 sends the SYN_REPLY message for the stream ID 5. In one example, the sub-context 458 may be generated after processing of the stream ID 3 is completed and the sub-context 456 has been removed to free up memory space on the memory 450.

At block 430, the server 106 may send data packets associated with the stream ID 5. For example, the multiplexed data stream 464 illustrates a data packet associated with the stream ID 5. The UTM device 104 may examine each data packet for stream ID 5 and the entire file for stream ID 5 similar to the stream ID 1 and stream ID 3, as described above. For example, the UTM device 104 may compute hash values for each data packet for stream ID 5 and have the hash value compared to the hash values of known malware stored in the signature DB 462 via the cache lookup 460. At block 432, the server 106 may send a DATA_FIN message for the stream ID 5 and the method 400 may end.

It should be noted that blocks 426-432 may not occur in the order that is illustrated in FIG. 4. For example, if the priority level of stream ID 5 was not altered and remained 0, then the SYN_REPLY message in block 428 may have been sent before the DATA_FIN message was sent in block 426. In other words, due to the higher priority of the stream ID 5, in one example, the server 106 may immediately begin sending data packets for stream ID 5 before the data packets for stream ID 3 have all been sent. Thus, the multiplexed data stream 464 may have additional data packets associated with stream ID 1 or stream ID 3 after data packets associated with stream ID 5.

Figure 5:
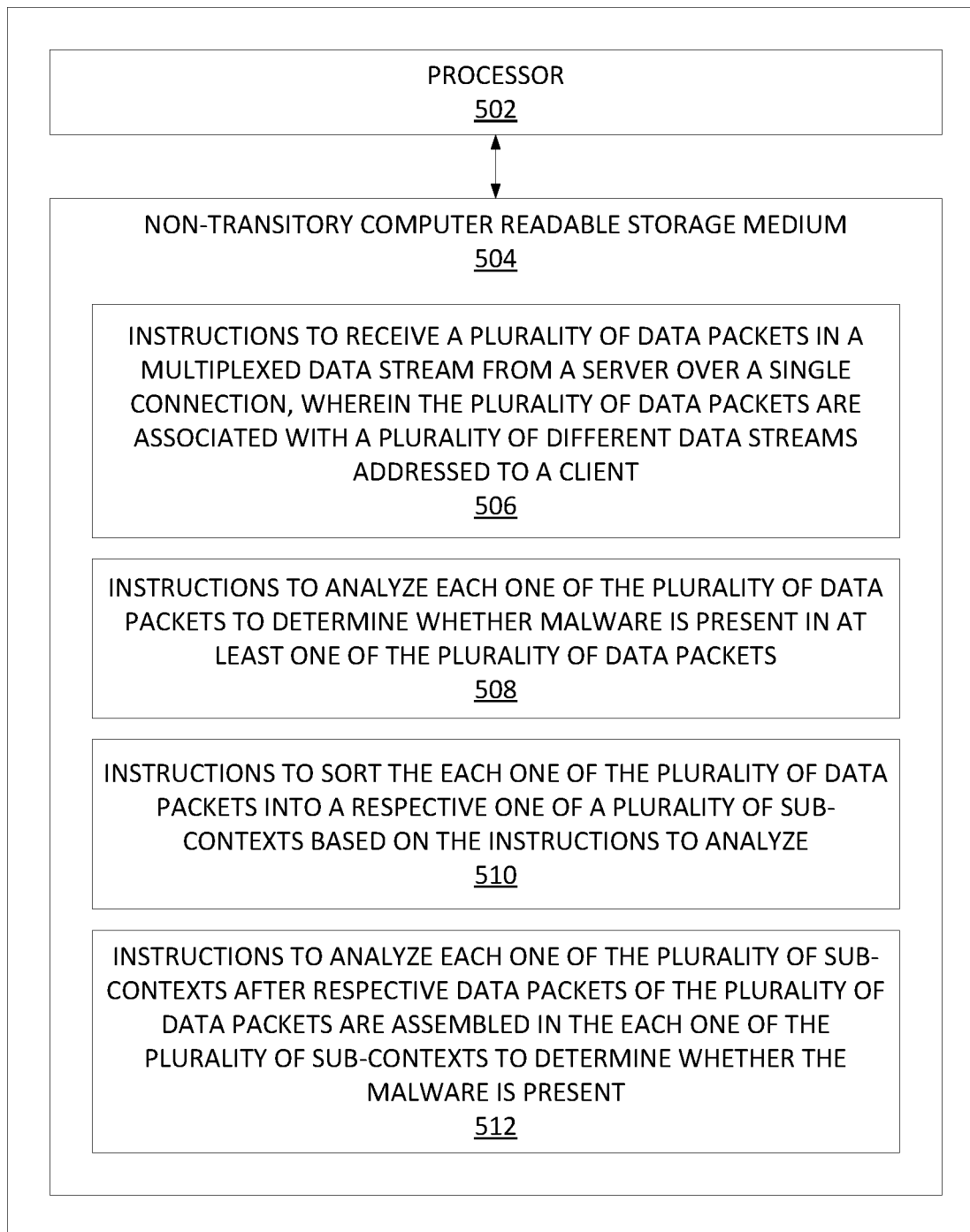
FIG. 5 is another example of an apparatus of the present disclosure.

FIG. 5 illustrates another example of an apparatus 500. In one example, the apparatus 500 may also be the UTM device 104. In one example, the apparatus 500 may include a processor 502 and a non-transitory computer readable storage medium 504. The non-transitory computer readable storage medium 504 may include instructions 506, 508, 510 and 512 that when executed by the processor 502, cause the processor 502 to perform various functions.

In one example, the instructions 506 may include instructions to receive a plurality of data packets in a multiplexed data stream from a server over a single transmission control (TCP) connection that uses a SPDY protocol, wherein the plurality of data packets are associated with a plurality of different data streams addressed to a client. The instructions 508 may include instructions to analyze each one of the plurality of data packets to determine whether a malware is present in at least one of the plurality of data packets. The instructions 510 may include instructions to sort the each one of the plurality of data packets into a respective one of a plurality of sub-contexts based on the instructions to analyze. The instructions 512 may include instructions to analyze each one of the plurality of sub-contexts after respective data packets of the plurality of data packets are assembled in the each one of the plurality of sub-contexts to determine whether the malware is present.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
  receiving, by a processor, a multiplexed data stream from a server over a single transmission control protocol (TCP) connection that uses a SPDY protocol, wherein the multiplexed data stream contains data packets associated with a plurality of different data streams addressed to a client;
  generating, by the processor, a plurality of sub-contexts, wherein each one of the plurality of sub-contexts is associated with a different one of the plurality of different data streams, each of the plurality of sub-contexts comprising a temporary buffer in memory used to re-assemble the data packets into respective data streams of the plurality of different data streams;
  demultiplexing, by the processor, the data packets from the multiplexed data stream into a respective one of the plurality of sub-contexts; and
  examining, by the processor, the plurality of different data streams in the respective one of the plurality of sub-contexts to detect a malware.

2. The method of claim 1, comprising:
  dropping, by the processor, the single TCP connection to stop transmission of the multiplexed data stream when the malware is detected.

3. The method of claim 1, wherein the examining is performed on each one of the data packets in the multiplexed data stream.

4. The method of claim 1, wherein the examining is performed on a completed sub-context that contains an assembled one of the plurality of different data streams.

5. The method of claim 1, wherein the examining comprises performing a hash computation on the data packets to generate a hash value and comparing the hash value to hash values associated with signatures of malware stored in a database.

6. The method of claim 1, comprising:
  receiving, by the processor, a new request for a new data stream that has a priority level that is higher than a priority level of the plurality of different data streams;
  determining, by the processor, that a memory storing the plurality of sub-contexts is full; and
  changing, by the processor, the priority level of the new data stream to be equal to the priority level of the plurality of different streams.

7. An apparatus, comprising:
  a connection processor for passing transmission control protocol (TCP) messages to establish a TCP connection that uses a SPDY protocol;
  a sub-context generator, in communication with the connection processor, that generates a plurality of sub-contexts, wherein each one of the plurality of sub-contexts is associated with a different one of a plurality of different data streams comprising data packets received from a server via a multiplexed data stream over the TCP connection and addressed to a client, and wherein, each of the plurality of sub-contexts comprises a temporary buffer in memory used to re-assemble the data packets into respective data streams of the plurality of different data streams; and
  a malware detector that examines the plurality of different data streams in the respective one of the plurality of sub-contexts to detect a malware.

8. The apparatus of claim 7, wherein the connection processor drops the TCP connection when the malware is detected.

9. The apparatus of claim 7, wherein the malware detector examines each one of the data packets in the multiplexed data stream.

10. The apparatus of claim 7, wherein the malware detector examines a completed sub-context that contains an assembled one of the plurality of different data streams.

11. The apparatus of claim 7, wherein the sub-context generator performs a hash computation on the data packets to generate a hash value and the malware detector compares the hash value to hash values associated with signatures of malware stored in a database.

12. The apparatus of claim 7, wherein connection processor receives a new request for a new data stream that has a priority level that is higher than a priority level of the plurality of different data streams, determines that a memory that stores the plurality of sub-contexts generated by the sub-context generator is full and changes the priority level of the new data stream to be equal to the priority level of the plurality of different streams.

13. A non-transitory computer readable storage medium encoded with instructions executable by a processor, the non-transitory computer-readable storage medium comprising:
   instructions to receive a plurality of data packets in a multiplexed data stream from a server over a single connection, wherein the plurality of data packets are associated with a plurality of different data streams of the multiplexed data stream addressed to a client;
   instructions to analyze each one of the plurality of data packets to determine whether a malware is present in at least one of the plurality of data packets;
   instructions to sort the each one of the plurality of data packets into a respective one of a plurality of sub-contexts based on the instructions to analyze, each of the plurality of sub-contexts comprising a temporary buffer in memory used to assemble the data packets into respective data streams of the plurality of different data streams; and
   instructions to analyze each one of the plurality of sub-contexts after respective data packets of the plurality of data packets are assembled in the each one of the plurality of sub-contexts to determine whether the malware is present.

14. The non-transitory computer readable storage medium of claim 13, comprising:
   instructions to drop the single connection when the malware is determined to be present.

15. The non-transitory computer readable storage medium of claim 13, comprising:
   instructions to receive a new request for a new data stream that has a priority level that is higher than a priority level of the plurality of different data streams;
   instructions to determine that a memory storing the plurality of sub-contexts is full; and
   instructions to change the priority level of the new data stream to be equal to the priority level of the plurality of different streams.

16. The method of claim 3, further comprising:
   holding each of the data packets associated with each of the plurality of different data streams until an entirety of the data packets associated with a data stream of the plurality of different data streams has been examined; and
   forwarding a complete file associated with the data stream to the client in response to detecting no malware.

17. The apparatus of claim 11, wherein the sub-context generator comprises a cache lookup temporarily storing each of the data packets until the malware detector examines an entirety of the data stream to which the data packets belong.

18. The non-transitory computer readable storage medium of claim 13, comprising instructions to perform a hash computation on the data packets to generate a hash value and compare the hash value to hash values associated with signatures of malware stored in a database.

* * * * *